(12) United States Patent
Li et al.

(10) Patent No.: US 9,996,803 B2
(45) Date of Patent: Jun. 12, 2018

(54) SYSTEMS AND METHODS FOR AUTHENTICATING A USER THROUGH AN UNOBSERVABLE RE-AUTHENTICATION SYSTEM

(71) Applicant: The Arizona Board of Regents for and on behalf of Arizona State University, Tempe, AZ (US)

(72) Inventors: Lingjun Li, Tempe, AZ (US); Xinxin Zhao, Tempe, AZ (US); Guoliang Xue, Chandler, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 538 days.

(21) Appl. No.: 14/476,364

(22) Filed: Sep. 3, 2014

(65) Prior Publication Data
US 2015/0066822 A1    Mar. 5, 2015

Related U.S. Application Data

(60) Provisional application No. 61/873,094, filed on Sep. 3, 2013.

(51) Int. Cl.
| G06N 99/00 | (2010.01) |
| G06F 21/44 | (2013.01) |
| G06F 21/31 | (2013.01) |
| H04L 29/06 | (2006.01) |

(52) U.S. Cl.
CPC ......... *G06N 99/005* (2013.01); *G06F 21/316* (2013.01); *G06F 21/44* (2013.01); *H04L 63/0421* (2013.01)

(58) Field of Classification Search
None
See application file for complete search history.

(56) References Cited

U.S. PATENT DOCUMENTS

| 6,463,433 | B1* | 10/2002 | Baclawski | ........ G06F 17/30542 |
| 7,822,605 | B2* | 10/2010 | Zigel | ...................... G10L 17/06 |
| | | | | 704/246 |
| 8,174,503 | B2* | 5/2012 | Chin | ................... G06F 3/04883 |
| | | | | 345/156 |
| 8,402,372 | B2 | 3/2013 | Gillespie et al. | |
| 9,262,612 | B2* | 2/2016 | Cheyer | ................... G06F 21/32 |
| 2007/0050467 | A1* | 3/2007 | Borrett | ............. G06F 17/30011 |
| | | | | 709/213 |
| 2009/0052527 | A1 | 2/2009 | Yu et al. | |
| 2010/0225443 | A1 | 9/2010 | Bayram et al. | |
| 2011/0050394 | A1 | 3/2011 | Zhang et al. | |

(Continued)

FOREIGN PATENT DOCUMENTS

EP    2541452 A1    2/2013

OTHER PUBLICATIONS

Uno Andre Johansen, "Keystroke Dynamics on a Device with Touch Screen", Master's Thesis published by Department of Computer Science and Media Technology, Gjøvik University College, 2012, pp. 1-78.*

(Continued)

*Primary Examiner* — Alan S Chen
(74) *Attorney, Agent, or Firm* — Polsinelli PC

(57) ABSTRACT

Systems and methods for authenticating a user through an unobservable re-authentication process are disclosed.

11 Claims, 4 Drawing Sheets

(56) References Cited

U.S. PATENT DOCUMENTS

2011/0283241 A1  11/2011  Miller et al.
2013/0111580 A1  5/2013  Checco

OTHER PUBLICATIONS

Feng et al., Continuous Mobile Authentication using Touchscreen Gestures, 2012, IEEE, pp. 451-456 (Year: 2012).*

Frank et al., Touchalytics: On the Applicability of Touchscreen Input as a Behavioral Biometric for Continuous Authentication, Jan. 2013, IEEE Transactions on Information Forensics and Security, vol. 8, No. 1, pp. 136-148 (Year: 2013).*

L. Li et al., "Unobservable Re-authentication for Smartphones", NDSS Symposium, San Diego, Feb. 25, 2013.

A. Ahmed and I. Traore. Anomaly intrusion detection based on biometrics. In Information Assurance Workshop, 2005. IAW'05. Proceedings from the Sixth Annual IEEE SMC, pp. 452-453. IEEE, 2005.

A. Ahmed and I. Traore. A new biometric technology based on mouse dynamics. IEEE Transactions on Dependable and Secure Computing, 4(3):165-179, 2007.

F. Bergadano, D. Gunetti, and C. Picardi. User authentication through keystroke dynamics. ACM Transactions on Information and System Security (TISSEC), 5(4):367-397, 2002.

http://www.biosig-id.com/about-bsi/media-press/press-releases/333-bi...biometrics-to-authenticate-student-id-with-houston-community-college, Feb. 7, 2011 (downloaded May 22, 2015).

C. Castelluccia and P. Mutaf. Shake them up!: a movement-based pairing protocol for cpu-constrained devices. In MobiSys, pp. 51-64, 2005.

T.Clancy, N.Kiyavash, and D.Lin. Secure smartcard-based fingerprint authentication. In Proceedings of the 2003 ACM SIGMM workshop on Biometrics methods and applications, pp. 45-52. ACM, 2003.

M. Conti, I. Zachia-Zlatea, and B. Crispo. Mind how you answer me!: transparently authenticating the user of a smartphone when answering or placing a call. In Proceedings of ASIACCS2011, pp. 249-259, Hong Kong, China, 2011. ACM.

A. De Luca, A. Hang, F. Brudy, C. Lindner, and H. Hussmann. Touch me once and i know it's you!: implicit authentication based on touch screen patterns. In Proceedings of the 2012 ACM annual conference on Human Factors in Computing Systems, pp. 987-996. ACM, 2012.

B. Duc, S. Fischer, and J. Bigun. Face authentication with gabor information on deformable graphs. IEEE Transactions on Image Processing, 8(4):504-516, 1999.

H. Gamboa and A. Fred. A behavioral biometric system based on human-computer interaction. In Proceedings of SPIE, vol. 5404, pp. 381-392, 2004.

Z. Jorgensen and T. Yu. On mouse dynamics as a behavioral biometric for authentication. In Proceedings of the ASIACCS2011, pp. 476-482, Hong Kong, China, 2011.

N. Kirschnick, S. Kratz & S. Moeller, Poster: An Improced Approach to Gesture-Based Authentication for Mobile Devices. In Symposium on Usable Privacy and Security (SOUPS), Redmond, WA, USA, 2010.

J. Mantyjarvi, M. Lindholm, E. Vildjiounaite, S. Makela, and H. Ailisto. Identifying users of portable devices from gait pattern with accelerometers. In Proceedings of ICASSP'05, vol. 2, pp. ii-973. IEEE, 2005.

R. Mayrhofer and H. Gellersen. Shake well before use: Intuitive and secure pairing of mobile devices. IEEE Trans. Mob. Comput., 8(6):792-806, 2009.

F. Monrose, M. Reiter, and S. Wetzel. Password hardening based on keystroke dynamics. International Journal of Information Security, 1(2):69-83, 2002.

F. Monrose and A. Rubin. Authentication via keystroke dynamics. In Proceedings of the 4th ACM conference on Computer and communications security, pp. 48-56. ACM, 1997.

Y. Nakkabi, I. Traore, and A. Ahmed. Improving mouse dynamics biometric performance using variance reduction via extractors with separate features. IEEE Transactions on Systems, Man and Cybernetics, Part A: Systems and Humans 40(6):1345-1353, 2010.

F. Okumura, A. Kubota, Y. Hatori, K. Matsuo, M. Hashimoto, and A. Koike. A study on biometric authentication based on arm sweep action with acceleration sensor. In Proceedings of ISPACS'06, pp. 219-222. IEEE, 2006.

S.M. Patel, K.S. Perce & G.D. Abowd, A Gesture-based Authentication Scheme for Untrusted Public Terminals,UIST '04, Santa Fe, New Mexico, USA, 2004.

M. Pusara and C. Brodley. User re-authentication via mouse movements. In Proceedings of the 2004 ACM workshop on Visualization and data mining for computer security, pp. 1-8. ACM, 2004.

M. Qi, Y. Lu, J. Li, X. Li, and J. Kong. User-specific iris authentication based on feature selection. In Proceedings of ICCSSE 2008, vol. 1, pp. 1040-1043. IEEE, 2008.

C. Varenhorst, Passdoodles; a Lightweight Authentication Method, Research Science Institute, Jul. 27, 2004.

R. Yampolskiy and V. Govindaraju. Behavioural biometrics: a survey and classification. International Journal of Biometrics, 1(1):81-113, 2008.

N. Zheng, A. Paloski, and H. Wang. An efficient user verification system via mouse movements. In Proceedings of ACM CCS2012, pp. 139-150. ACM, 2011.

\* cited by examiner

SYSTEMS AND METHODS FOR AUTHENTICATING A USER THROUGH AN UNOBSERVABLE RE-AUTHENTICATION SYSTEM

CROSS REFERENCE TO RELATED APPLICATIONS

This application claims benefit to U.S. provisional application Ser. No. 61/873,094 filed on Sep. 3, 2013, and is herein incorporated by reference in its entirety.

STATEMENT REGARDING FEDERALLY SPONSORED RESEARCH OR DEVELOPMENT

This invention was made with government support under W911NF-09-1-0467 awarded by the Army Research Office (ARMY/ARO). This invention was also made with government support from the National Science Foundation (NSF) #1217611. The United States Government has certain rights in the invention.

FIELD

The present document generally relates to user authentication and security for devices, and in particular to an unobservable re-authentication system for smart devices.

SUMMARY

Systems and methods for an unobservable user authentication system for smartphones are disclosed. The unobservable authentication system captures user interactions with the smartphone and checks those captured user interactions against known data of an authorized owner of the smart device. If the captured user interaction data is determined to be that of the authorized owner, the smart device will allow the user to continue using the smart device. If the captured user interaction data is determined to be from someone not authorized to use the particular smart device, that user will be prevented from continued use until further authentication measures are met.

In one embodiment, the unobservable authentication system may include collecting a plurality of data related to an authorized owner; capturing a plurality of data related to a user's interaction with a smart device; authenticating the user based on the user's interaction with the smart device through an authentication module to determine if the user is the authorized owner of the smart device being used, wherein authenticating the user is performed automatically and does not require specific prompts for user interaction to accomplish the authentication.

The plurality of data related to an authorized owner may be collected from a training module or from the authorized owner's interaction with the smart device. The training module may further include: initializing the authorized owner's gesture feature data; obtaining a plurality of classification modules from the authorized owner's gesture feature data; downloading a plurality of other people's gesture feature data to the device, wherein the other user's gesture feature data may be anonymous and/or used for training purposes; uploading the authorized owner's gesture data to a server; and downloading the gesture feature data from the server onto a computer device.

The authentication module may further include: assembling the plurality of user interaction data into a plurality of gestures; extracting a plurality of features from the plurality of gestures; and predicting whether the plurality of features belong to the authorized owner.

The user interaction data captured by the unobservable authentication system may include directional (left, right, up, down) swiping motions and/or tapping motions of the user. In addition, a classification module of the training module may be determined based on a plurality of factors, such as the owner's feature gesture data and a plurality of features from a plurality of other users. The classification module may further include a file containing parameters for a classification algorithm. In particular, the classification module may be generated by the training module which may be further deployed on a computer device and may be downloaded onto the smart device.

In another embodiment, a method to authenticate an authorized owner of a smart device may include: collecting a plurality of data related to an authorized owner of a smart device; capturing a plurality of data related to a user's interaction with the smartphone; determining whether the captured user interaction data matches up with the data related to the authorized owner; and authenticating the authorized owner wherein authenticating the user is automatic and does not require specific prompts for user interaction with the smart device.

The plurality of data related to an authorized owner may be collected from a training module or from the authorized owner's interactions with the smart device. The training module may further include: obtaining a plurality of classification modules, wherein each classification module may represent a specific gesture feature data; downloading the feature data of other users to be used as a comparison tool; uploading the authorized owner's gesture feature data to a server; and downloading the gesture feature data from the server to a computer device.

The authentication module may further include assembling the plurality of user interaction data and extracting a plurality of gesture feature data from the interaction data, wherein the extracted gesture feature data may be used to verify the authorized owner. The user interaction data may include, but is not limited to, hand, finger, facial, speech, or a combination.

Authenticating the authorized owner may further include determining whether the features captured from the user of the smart device matches previously obtained features of the authorized owner of the smart device, wherein a plurality of classification modules may be user. In particular, each classification module may correspond to a specific feature gesture data captured from the user and may be determined using a classification algorithm.

In another embodiment, an unobservable method of authenticating the authorized owner of a smart device comprises: capturing a plurality of data from the smart device; comparing the captured data with a plurality of already known data about the authorized owner of the smart device; and authenticating the authorized owner, wherein the authentication process is performed without specific prompts for user interaction with the smart device.

In some embodiments, capturing the smart device data may further include monitoring a user's finger movements. In some embodiments, comparing the captured smart device data with the known authorized owner's data may further include comparing a user's finger movements with the owner's finger movements. In some embodiments, authenticating the authorized owner may further include a metric design that compares the user's gestures, such as sliding and tapping, with the owner's similar gestures. An error message may be presented in the case that the authorized owner cannot be authenticated.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
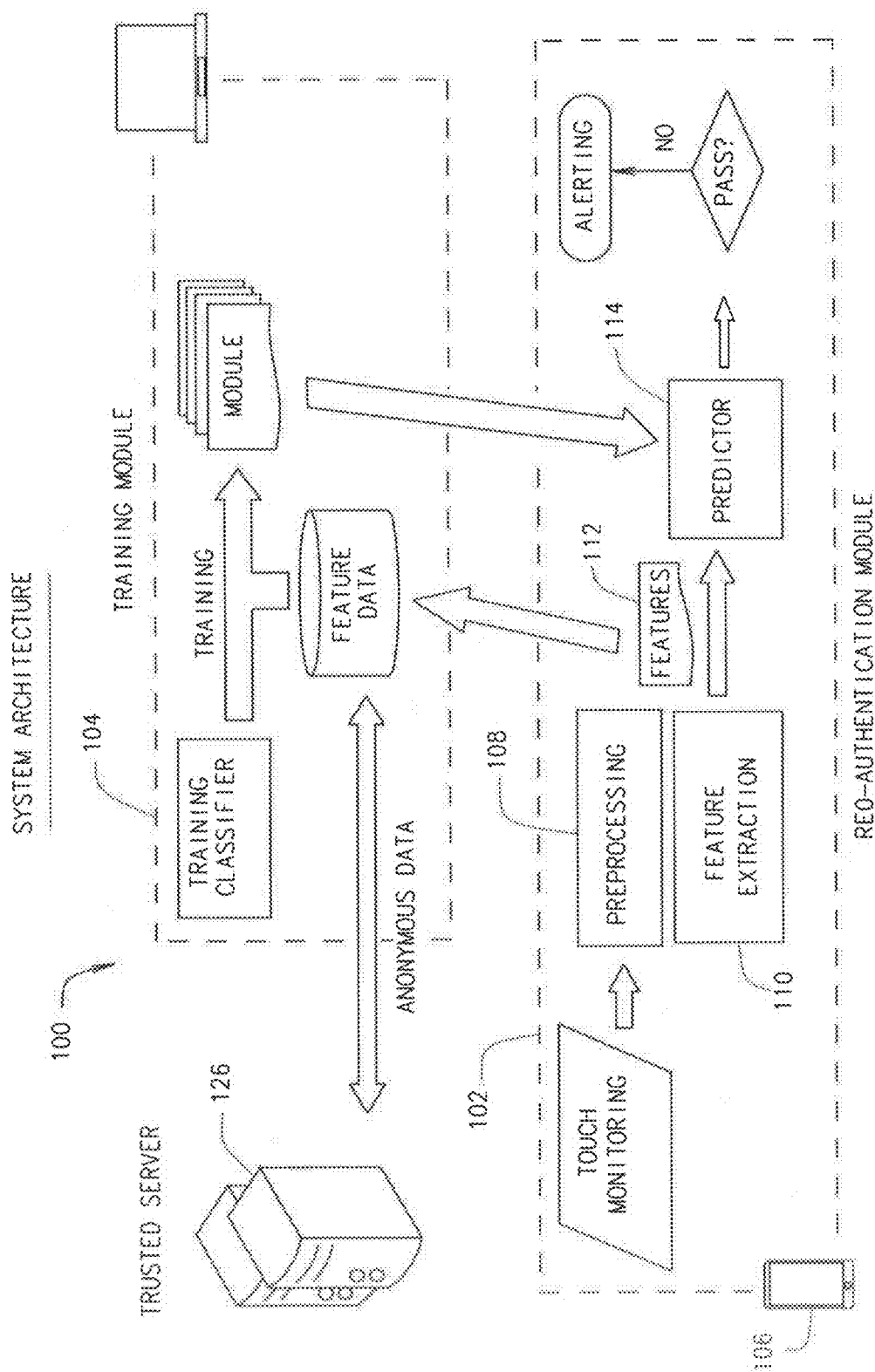
FIG. 1 is a simplified illustration showing the re-authentication and training modules for the system architecture of the unobservable authentication system.

In one embodiment, the unobservable authentication system, generally designated 100 in FIGS. 1-4 may be used to authenticate the verified user of a smart device 106. As shown, the unobservable authentication system 100 may be partitioned into two components: a re-authentication module 102 and a training module 104. The re-authentication module 102 may be implemented to continuously authenticate the current user throughout the user's interaction with the unobservable authentication system 100. In addition, the training module 104 may be implemented to learn the gesture data of the owner of a particular smart device 106 for authentication purposes. The unobservable authentication system 100 may be implemented as an application on the smart device 106 or may be embedded into the operating system of the smart device 106.

The re-authentication module 102 may be implemented to continuously run in the background of the smart device 106. The re-authentication module 102 may monitor and capture a user's raw touch event data and then may send this data to the preprocessing component 108. The preprocessing component 108 may assemble every single raw data into different gestures and then may send these gestures to the feature extraction component 110. The feature extraction component 110 may extract features 112 from the gesture data and may form feature vectors from the gesture data. The feature vector may then be sent to the predictor component 114. The predictor component 114 may make a prediction based on the feature vector data. If the feature vector is predicted to be from the authorized owner the smart device 106, the re-authentication process is passed. If the feature vector is predicted to not be from the authorized owner, an alert message may be sent to the operating system. One possible action the operating system may take is to lock down the system and ask the user to input an administrator password. In another embodiment, possible actions may include sending a message with the current GPS information of the smart device 106 in an e-mail to the authorized owner.

Figure 2:
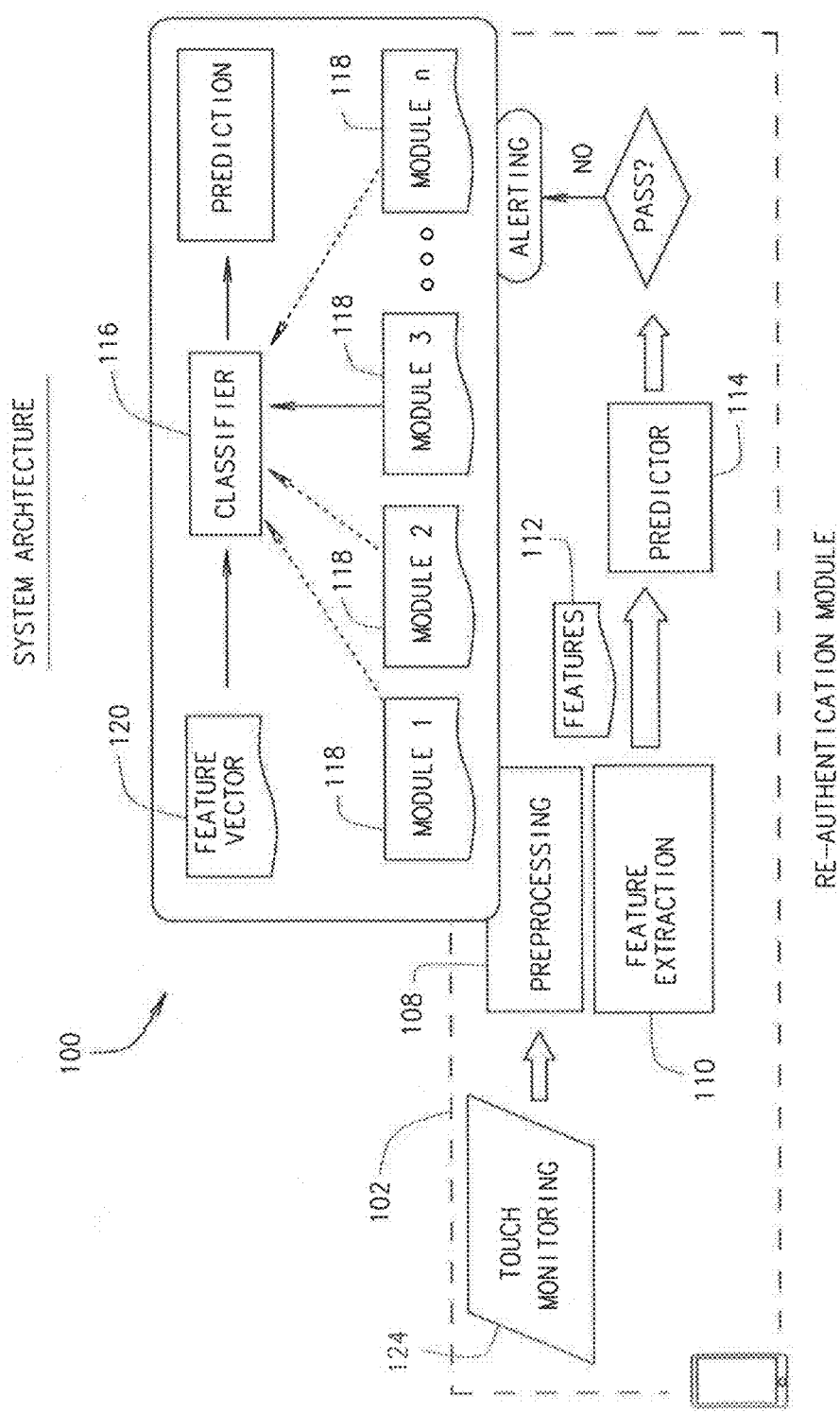
FIG. 2 is a simplified illustration showing the re-authentication and predictor component of the unobservable authentication system.

In one embodiment shown in FIG. 2, the predictor component 114 of the unobservable authentication system 100 may include a classifier 116 and multiple classification modules 118. In some embodiments, the classifier 116 may be a classification algorithm which uses an object's feature vector to identify which class the object belongs to. In one embodiment, the classification algorithm may be a support vector machine (SVM) algorithm. In other embodiments, the classification algorithm may be implemented using a different algorithm or technique designed to identify and/or isolate specific types of feature vectors.

Each classification module 118 may be in charge of a main gesture type (e.g., a sliding right gesture type or a sliding up gesture type) or a combination of a main gesture type and an auxiliary type. In some embodiments, the classification module 118 may be file containing parameters for the classification algorithm and may determine the classifier's functionality.

In some embodiments, the classification algorithm may be embedded in the classifier 116. The classifier 116 using different classification modules may make predictions on feature vectors 120 of different gesture types shown in FIG. 3. When a feature vector 120 is passed to the classifier 116, the classifier 116 may choose a corresponding classification module 118 or modules 118 to make a prediction. For example, when the unobservable authentication system 100 determines that a sliding up gesture is captured, the corresponding sliding up classification module or modules may be used to make a prediction as to whether the captured sliding up gesture is that of the authorized owner or if it belongs to someone else (i.e., an unauthorized user.

In one embodiment shown back in FIG. 1, the training module 104 may be executed on the owner's personal computer 122. The training module 104 requires more computational complexity than the authentication module 118, making it a better fit to be executed on a more power computing machine such as a desktop computer. In other embodiments, the training module 104 may be incorporated directly onto the smart device 106 instead of another separate computing device. In other embodiments, the training module 104 may be implemented on any computing device capable of handling the necessary computational requirements. The device may comprise a desktop computer, a laptop, a mobile device, and/or any other device capable of handling the required computational requirements.

The owner of the smart device 106 may choose to enroll in the unobservable authentication system 100, wherein the unobservable authentication system 100 may collect the owner's gesture features by using the touch monitoring component 124, the preprocessing component 108, and/or feature extraction component 110 of the re-authentication module 102. For example, when the user first enrolls in the unobservable authentication system 100, they may input a certain number of swiping motions to serve as a baseline model against which future swipes are compared to. In other embodiments, the owner's gesture features may be collected by other means. For example, the owner's gesture features may be collected by downloaded from a database or uploaded to the system by the user.

As further shown in FIG. 2, a secure data sever 126 may be implemented to collect and/or store the feature data 112 from owners of smart devices 106 and may download them to the training module 104 when necessary. For example, the secured server may be deployed by the unobservable authentication system 100 and each owner who enrolls in the unobservable authentication system 100 may have an account to access, manage, and alter their information.

To protect an owner's privacy, the data collection may be done anonymously. Generally speaking, anonymous data collection allows a collector to collect data from a group of members without knowing the submitter's identity for any given set of data. One possible approach for anonymous data collection is to use an additive homomorphic feature of the simple [n, n] secret sharing system. For example, there are 3 members Alice, Bob, and Charlie. A person wants to share a secret "s" among the three members. He selects 3 integers, a, b, and c, such that s=a+b+c. Alice, Bob, and Charlie respectively get a, b, and c. Now, secret "s" can be recovered only if all the three members expose their integers. The additive homomorphic feature states that an addition of two shares yields a share of the addition of the two secrets. For example, two secrets s1, s2 have been shared among the three members in the aforementioned way such that s=a1+b1+c1, s2=a2+b2+c2. Alice obtains a1 and a2. So are Bob and Charlie. If Alice adds a1 and a2, she immediately obtains a share of s1+s2. It is because s1+s2=a1+b1+c1+a2+b2+c2=(a1+a2)+(b1+b2)+(c1+c2).

In an anonymous data collection system, suppose Alice, Bob, and Charlie want to submit data d1, d2, and d3, respectively, to a collector. A requirement is that all data pieces are of the same length, I bits. Alice first encrypts d1 using key k1and obtains a cipher text e1. Next, Alice constructs a message, s1, of 3I bits, such that the first I bits are filled by e1 and zeroes out the remaining bits. Alice divides s1 into three shares s1=a1+b1+c1 and sends b1, c1 respectively to Bob, Charlie. Bob and Charlie do the similar thing except that Bob fills the second I bits in his message with e2 and Charlie fills the third I bits. Now, Alice has a1, a2, and a3. Bob has b1, b2, and b3. Charlie has c1, c2, and c3. Alice then adds her shares together obtaining a'=a1+a2+a3. Via the similar way, Bob and Charlie obtain b' and c'. They send their shares to the collector, who adds them together to obtain S=a'+b'+c'. We notice that S=s1+s2+s3. Furthermore, the first I bits of S is filled by e1, the second I bits by e2, and the third I bits by e3. The collector exposes S to all the members. When each member confirms that his cipher text is not altered, they send their individual key k1, k2, and k3 to the collector in the same fashion as the cipher texts are sent. With the keys, the collector can decrypt cipher texts and obtain the messages. However, given a particular message, he has no way to know who submits it. A fixed number of the user's feature data and/or a time stamp may form a ready-to-submit feature message in the anonymous data collection system.

Referring back to FIG. 1, every user in the unobservable authentication system 100 may be a group member and the server 126 may be the data collector in the anonymous group messaging system. The users may collectively shuffle their messages before the messages are handled in to the server. The goal is to prevent the server from knowing which particular user is associated with which particular message. The user's training module 104 can user other's feature data 112 but has no way to know the user identities.

The training module 104 may use the owner's features and other people's features in the training algorithm to obtain classification modules 118. After the training process is completed, the classification modules 118 may be downloaded onto the device. The training module 104 may anonymously upload the user's data to the secured server and may obtain anonymous features from it.

In one embodiment, the secured data server 126 does not participate in the re-authentication process and is only needed when an owner wants to re-train their classification modules 118, which may be done offline and on-demand. In other embodiments, the secured data server may participate in the re-authentication process.

Even though the owner's usage pattern is typically stable, an owner may change their usage pattern over a period of weeks or months which may lead to more false alarms. When this occurs, the classification modules 118 may need to be re-trained. To keep the classification modules 118 up to date, the unobservable authentication system 100 may allow for on-demand re-training. When the owner requests a re-training, the re-authentication module 102 may capture the owner's gestures, and may calculate and uploads the owner's feature vectors of the training module 104. The training module 104 may then download anonymous feature messages from the server 126, filter out the owner's own submissions, and run the classifier training algorithm again to obtain new classification modules 118.

Figure 3:
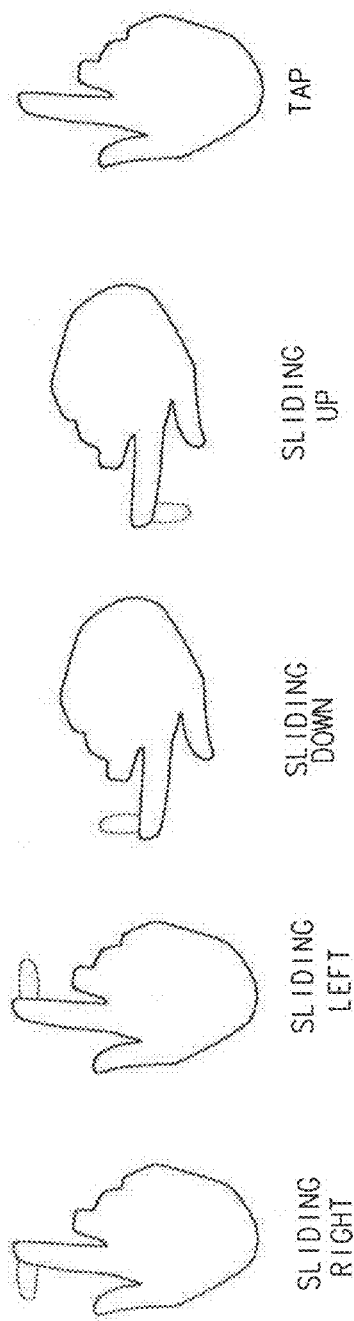
FIG. 3 shows various illustrations for different gestures used in the unobservable authentication system.

As shown in FIG. 3, the unobservable authentication system 100 monitors five types of gestures: sliding up, sliding down, sliding left, sliding right, and tap. Usually, sliding gestures are used to move content displayed on the screen or to navigate around while tap is mostly used to click links or a button within certain content. Although there are other gestures such as double tap, spread, and pinch, the give gestures monitored by the system are the most often used types when users interact with devices. In other embodiments, additional gestures may be captured and used to authenticate the user.

In one embodiment, the unobservable authentication system 100 is implemented on an Android based operating system. In other embodiments, the unobservable authentication system 100 may be implemented on other operating systems such as iOS, Windows, or other operating systems. The Android operating system requires that only the topmost applications can obtain touch events, dispatched from the Android system management service. In other words, in one embodiment, the unobservable authentication system 100 cannot enjoy the convenience that Android API provides to developers and will need to create a work around to this problem. In other embodiments, such direct access may be provided by the operating system which would result in not needing this extra step.

Figure 4:
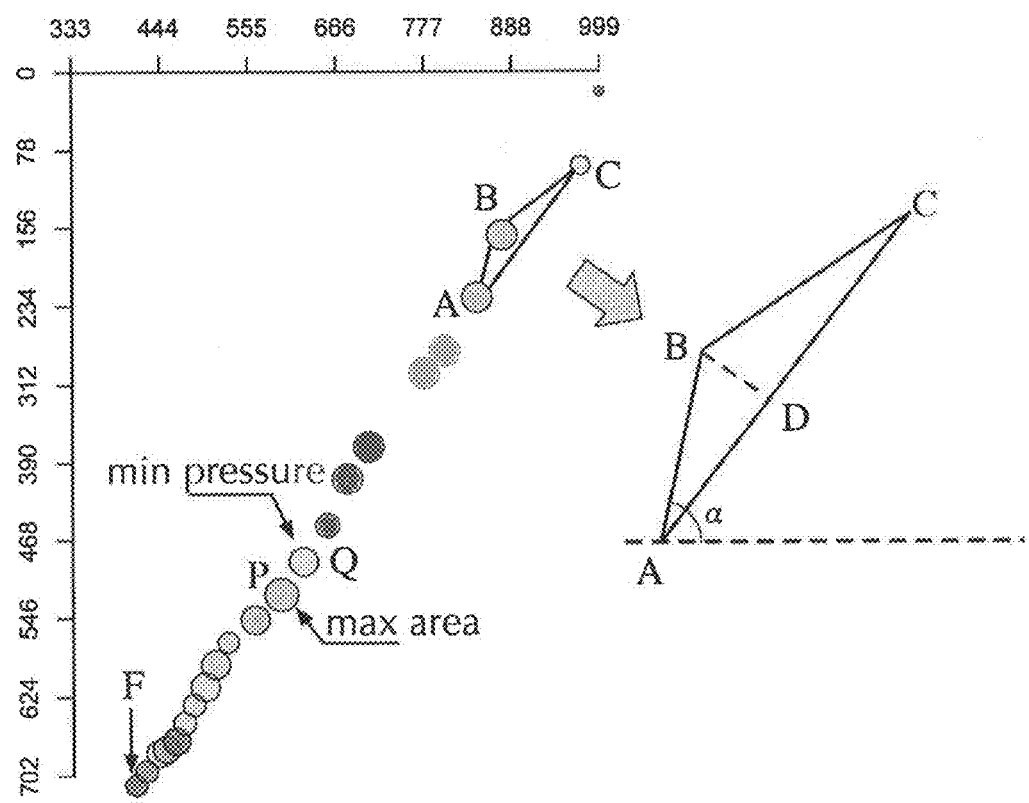
FIG. 4 is a graph illustrating the metrics used to identify sliding gestures for one embodiment of the unobservable authentication system.

Good features are critical to a supervised machine learning approach such as the one used in one embodiment of the unobservable authentication system 100. In one embodiment, the coordinates on the platform for the smart device 106 puts the origin at the top left corner of a screen. In other embodiments of the invention, different device platforms may have different origins for the coordinates. For example, the origin may be the top right corner, bottom right, the middle of the screen, or any other arbitrarily determined location. In one embodiment, each circle represents a finger touch because the exemplary Motorola Droid phone used to implement one embodiment of the invention views a finger touch as a circle. The size of the circle may show the size of the touch area and the brightness of a circle may show the strength of the touch pressure. As shown in FIG. 4, the movement starts at a point F and ends at a point C. The time between every pair of circles is the same. As the example shows, the finger moves slowly at first, then faster, because the circles become sparser as the finger moves.

In one embodiment of the invention, the following metrics may be used for identifying a sliding gesture:

| Metric | Description |
| --- | --- |
| First touch position | The coordinates (x and y) of the starting point in a slide. |
| First touch pressure | The pressure of the first touch. |
| First touch area | The touch area of the first touch. |
| First moving direction | The moving direction of a touch point is the angle between the horizontal line and the line crossing the point and its succeeding point. The angle, $\alpha$, in FIG. 4 is the moving direction of point A. First moving direction is the moving direction of the starting point. |
| Moving distance | The total distance of the sliding gesture. Particularly, it is the summation of the distances between every two continuous touch points. |
| Duration | The time duration of the whole sliding gesture. |
| Average moving direction | The average value of all the point's moving directions. The last point is not counted because it does not have a moving direction. |
| Average moving curvature | Given any three temporally continuous touch points, such as A, B, and C in FIG. 4, the corresponding moving curvature is angle ABC. The average value of the moving curvatures in the sliding gesture is selected as a metric. |
| Average curvature distance | Given any three consecutive points, such as A, B, and C in FIG. 4, the corresponding curvature distance is the distance from point B to line AC. An average of all the curvature distances is taken as a metric. |
| Average pressure | The average pressure of all touch pressures in the sliding gesture. |
| Average touch area | Average of all the touch areas. |
| Max-area portion | An index of all points according to the time order, starting from 1. The max-area proportion of the sliding gesture is the index of the max area touch point divided by the total number of the points in the sliding. This metric reflects which portion of the sliding contains the maximum touch point. |
| Min-pressure portion | Similar to max-area portion, the min-pressure portion is the index of the minimum pressure touch point divided by the total number of points. |

Tap is a simple gesture and does not provide much information about a user's finger movement patterns. A tap gesture may contain more than one touch points due to the high sample frequency of the screen for the smart device 106 and the slight tremble of a user's fingertip when they are in contact with the screen of the smart device 106. The metrics for a given tap gesture may include the following: average touch area; duration; average pressure. Similar to the calculation of a sliding feature vector, a tap feature vector is also the average metric values over a block of tap gestures.

Selecting good metrics is essential for a supervised machine learning method, such as the SVM method used in one embodiment of the present invention. A metric may be a good metric if it can be easily used to distinguish between two separate users. In one embodiment of the invention, for a metric to distinguish two separate users, it may be necessary to require the two underlying distributions to be different. Therefore, for a metric, a metric data set is constructed for each invited user in the data collection by calculating the metric value from each of their sliding gestures. Then, it is tested whether two metric data sets are from the same distribution. If most pairs of the data set are from the same distribution, the metric is bad in distinguishing two persons and may not be used.

In one embodiment, a two-sample Kolmogorov-Smirnov test (K-S test) to test if two metric data sets are significantly different may be used. Two-sample K-S tests is a nonparametric statistical hypothesis testing based on maximum distance between the empirical cumulative distribution functions of the two data sets. The two hypotheses of K-S tests are:

H0: the two data sets are from the same distribution.
H1: the two data sets are from different distributions.

A K-S test reports a p-value, i.e., the probability that obtaining the maximum distance is at least as large as the observed one when H0 is assumed to be true. If this p-value is smaller than a significant level a, usually set to 0.05, the system may reject H0 hypothesis because events with small probabilities happen rarely. For each metric, the system calculates the p-value for each pair of the metric data sets and drop the metric if most of its p-value is greater than a.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method to authenticate a user of a device through an unobservable authentication process, the method comprising:
    accessing first gesture data associated with an authorized owner;
    implementing a training module to apply machine learning to the first gesture data, comprising
        extracting features from the first gesture data, and
        generating a plurality of classification modules from the first gesture data;
    capturing second gesture data related to a user's interaction with the device;
    implementing a first instance of an authentication module to authenticate whether the second gesture data is associated with the authorized owner, comprising
        extracting user features from the second gesture data,
        forming a feature vector from the user features of the second gesture data,
        selecting a classification module from the plurality of classification modules based upon the feature vector,
        predicting whether the second gesture data is associated with the authorized owner by processing the feature vector with the classification module; and
    continuously authenticating the user based on the user's interaction with a content displayed by the device through the authentication module to determine if the user is the authorized owner,
    wherein authenticating the user is automatic and does not require specific prompts to the user.

2. The method of claim 1, further comprising:
    accessing a plurality of other people's gesture feature data to the device for comparison with the gesture data features,
    wherein the second gesture data is associated with finger sliding gestures, and, wherein the classification module is associated with a unique gesture type.

3. The method of claim 2, wherein the classification module further comprises a file containing parameters for a classification algorithm.

4. The method of claim 2, wherein the classification module is generated by the training module, the training module is further deployed on a computer.

5. The method of claim 1, wherein the second gesture data comprises at least one of:
  directional swiping motions, or
  tapping motions.

6. The method of claim 1, further comprising:
  implementing a second instance of the authentication module to authenticate whether third gesture data is associated with the authorized owner, comprising
  extracting additional user features from the third gesture data,
  forming an additional feature vector from the additional user features of the third gesture data,
  selecting another classification module from the plurality of classification modules based upon the additional feature vector, and
  predicting whether the third gesture data is associated with the authorized owner by processing the additional feature vector with the another classification module.

7. The method of claim 1, further comprising:
  generating metrics values associated with the second gesture data for comparison with the first gesture data using a plurality of metrics, comprising:
    identifying coordinates of a plurality of points associated with a sliding finger gesture across the device as defined by the second gesture data, the plurality of points including a starting point; and
    generating a first metric value of the metrics values for the sliding finger gesture using a moving distance metric defined by a summation of distances between every two continuous points of the plurality of points.

8. The method of claim 7, wherein the generating of the metrics values associated with the second gesture data for comparison with the first gesture data further comprises:
  generating a second metric value of the metrics values for the sliding finger gesture using an average moving direction metric defined by an average value of all of the plurality of points' moving directions except for a last point of the plurality of points,
  wherein the feature vector comprises an average of the metric values associated with the second gesture data.

9. A method to authenticate an authorized owner of a smartphone, the method comprising;
  collecting authorized owner data associated with an authorized owner of a smartphone;
  capturing user data associated with a user's interaction with the smartphone;
  determining whether the user data is associated with the authorized owner,
  comprising
    extracting features from the user data,
    forming a feature vector from the features of the user data,
    selecting a classification module based upon the feature vector,
    predicting whether the user data is associated with the authorized owner by processing the feature vector with the classification module;
  continuously capturing additional user data related to the user's interaction with the smartphone; and
  wherein authenticating the user is automatic and does not require specific prompts for user interaction with the smartphone.

10. The method of claim 9, wherein the authorized owner data is collected from a training module or from the authorized owner's interaction with the smartphone, the training module further comprising:
  obtaining a plurality of classification modules, wherein the classification modules represent a specific gesture feature data;
  downloading the feature data of other people to be used as a comparison tool;
  uploading the authorized owner's gesture feature data to a server; and
  downloading the gesture feature data from the server to a computer device.

11. The method of claim 9, wherein the user data comprises at least one of a hand, finger, facial, or speech action.

* * * * *